United States Patent

Smith Eugene

[15] 3,642,243

[45] Feb. 15, 1972

[54] VERTICALLY ADJUSTABLE SUPPORT

[72] Inventor: Smith Eugene, 329 West Park Ave., Apt. F, El Cajon, Calif. 92020

[22] Filed: Nov. 28, 1969

[21] Appl. No.: 880,808

[52] U.S. Cl. ..........................248/354 S, 248/405, 254/98
[51] Int. Cl. .......................................................F16m 11/00
[58] Field of Search ............248/354 R, 354 C, 354 L, 354 P, 248/354 S, 405, 406, 411, 412, 413, 163, 357, 351, 352; 254/98

[56] References Cited

UNITED STATES PATENTS

| 21,262 | 8/1858 | Leach | 248/405 |
| 966,883 | 8/1910 | Barron | 248/354 |
| 1,874,519 | 8/1932 | Haubrock | 248/354 UX |
| 3,493,209 | 2/1970 | Brammer | 248/352 |

Primary Examiner—J. Franklin Foss
Attorney—Warren H. F. Schmieding

[57] ABSTRACT

The support comprises a plurality of vertically extending, steel support members that angle upwardly toward one another to an area adjacent, but below, the upper ends thereof and angle upwardly and outwardly from that area. A threaded vertically extending, load supporting shaft extends through that area and above the upper ends of the support member. A nut on the shaft rests upon the upper ends of the support member which can be rotated for raising or lowering the shaft. The support members bend inwardly at the area to grasp the shaft when a load is placed on the top of the shaft.

4 Claims, 7 Drawing Figures

PATENTED FEB 15 1972
3,642,243
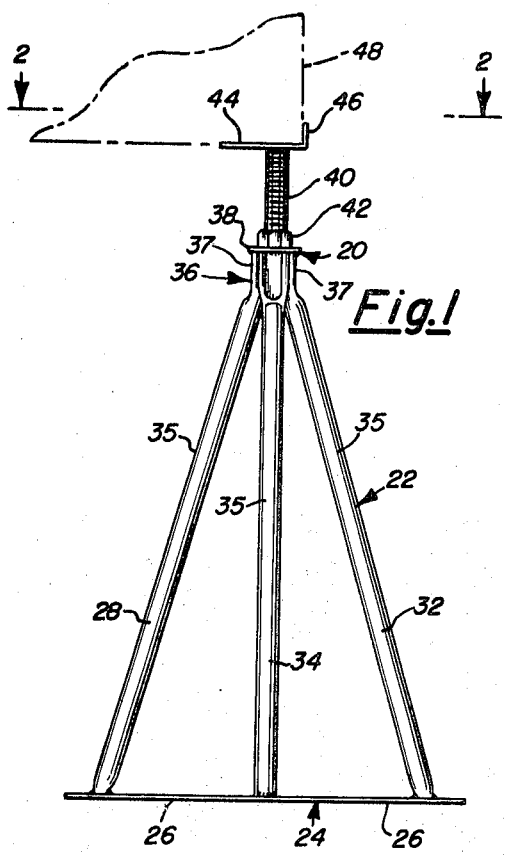
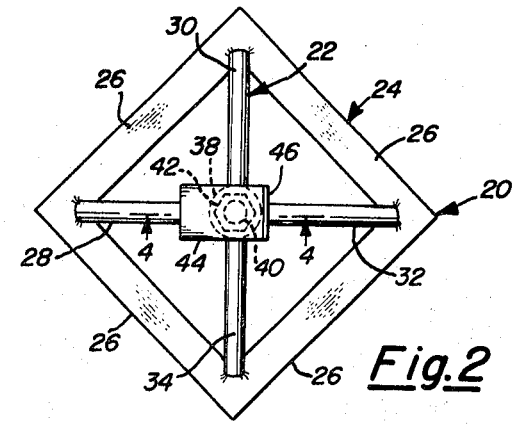
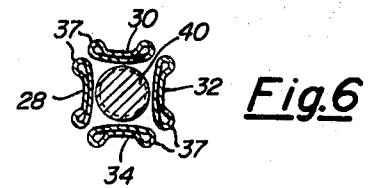
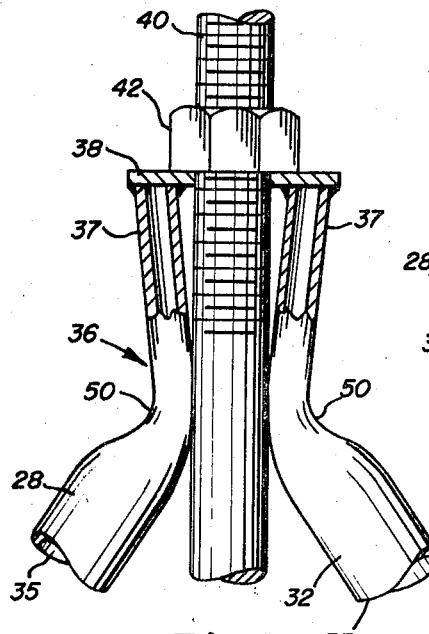
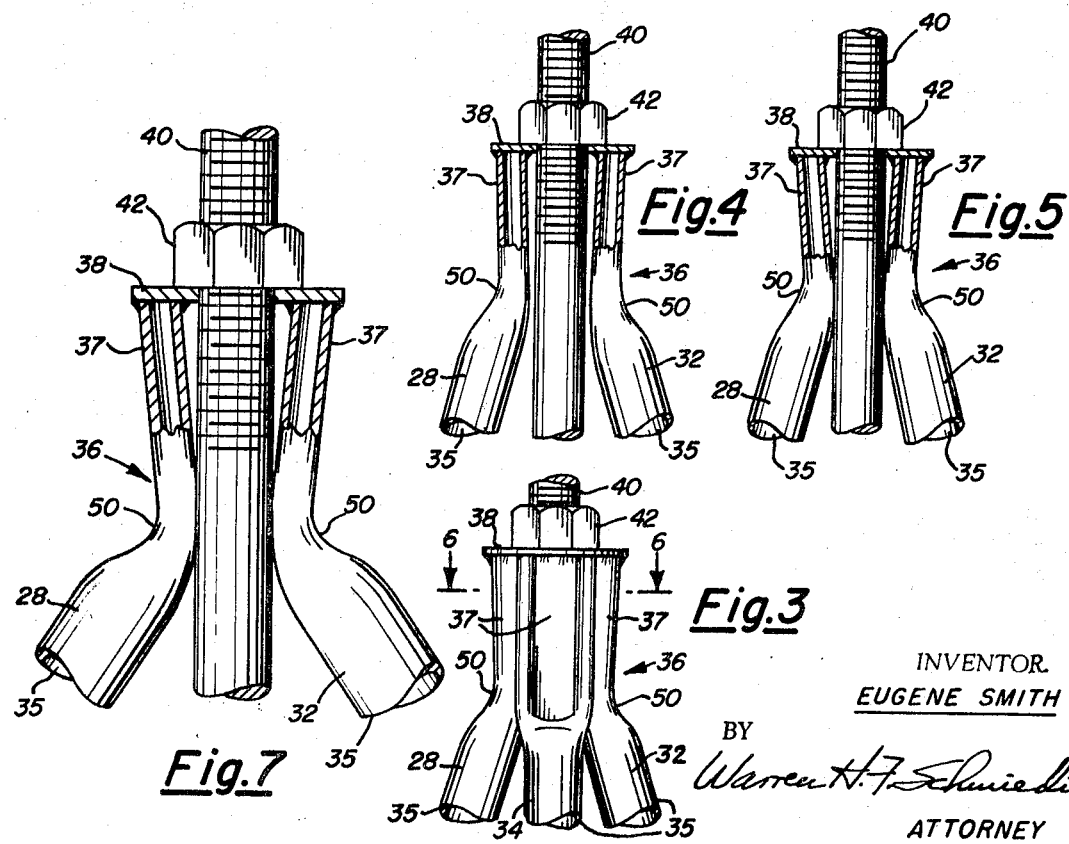
INVENTOR.
EUGENE SMITH
BY
Warren H. F. Schmiedin
ATTORNEY

3,642,243

VERTICALLY ADJUSTABLE SUPPORT

BACKGROUND OF THE INVENTION

1. Field of the Invention

The invention is directed to supports of the type that can be adjusted vertically.

2. Description of the Prior Art

The prior art known to applicant comprises a support for a threaded load supporting shaft and a nut for raising or lowering the shaft. However, the shaft can move laterally with respect to the support whereby the load supported by the shaft will move undesirably laterally.

SUMMARY OF THE INVENTION

The support includes a plurality of vertically extending steel support members which are joined with one another below the upper ends thereof. The lower sections and the upper ends of these members are fastened to one another. The members angle toward one another to an area adjacent but below the upper ends thereof. At least one and preferably all of the members angle upwardly and slightly outwardly from the area. A threaded shaft extends through the area and above the upper ends of the support members. A nut is threaded onto the shaft and this nut rests upon the upper ends of the support members. When the article to be supported rests on the top of the shaft, the weight of the article is sufficient to cause the support member to bend inwardly into frictional relationship with the shaft at the area. The frictional relationship is such that the turning of the nut will not effect turning of the shaft, but the relationship is such that the shaft can slide vertically when the nut is turned.

Other features and the advantages of the present invention will be apparent from the following description, reference being had to the accompanying drawing wherein a preferred embodiment of the invention is illustrated.

BRIEF DESCRIPTION OF THE DRAWING

FIG. 1 is a side view of the support and showing it as supporting a load;

FIG. 2 is a top plan view looking in the direction of arrows 2 of FIG. 1;

FIG. 3 is a side view of the upper part of the support shown in FIG. 1 but on a larger scale;

FIG. 4 is a longitudinal sectional view taken along line 4—4 of FIG. 2, but on the same scale as FIG. 3, the view showing the location of the support member when no load is on the support;

FIG. 5 is a view similar to FIG. 4, but showing the support members in grasping relationship with the shaft;

FIG. 6 is a sectional view taken along line 6—6 of FIG. 3; and

FIG. 7 is a fragmentary view on a still larger scale and also showing the exaggerated angular bends in the support members.

DESCRIPTION OF THE PREFERRED EMBODIMENT

The support 20 comprises a stand 22 including a square-shaped base 24 which is formed of four strips of sheet metal 26 having their ends fixed to one another as by welding. The stand 22 also includes preferably four support members 28, 30, 32 and 34. These members are formed preferably of steel pipes. The foot of each member is fixed to the base 24 as by welding.

The lower sections 35 of the support members angle upwardly and inwardly to an area 36 and then the upper sections 37 angle upwardly and slightly outwardly from the lower part of area 36, the latter angling being exaggerated in FIG. 7. The upper sections of the support members are flattened as shown in FIG. 6. The upper ends of the support members are fixed to one another, as by welding to a plate 38.

A threaded shaft 40 extends through the area 36, i.e., above and below that area. A nut 42 is threaded on the shaft and rests on the top plate 38 of the stand 22. A plate or platform 44 is fixed, as by welding, to the upper end of the shaft 40. By turning the nut 42 in one direction and by preventing the turning of the shaft 40, the shaft will be raised. Likewise, by turning the nut in the opposite direction and by preventing the turning of the shaft, the shaft will be lowered. An upwardly extending projection in the form of flange 46, when in abutting relation with the load 48, as shown in FIG. 1, prevents turning of the shaft 40 when the nut 42 is turned.

The diameter of the shaft 40 is slightly less than the minimum width of the area 36. However, when a load, such as a house trailer, is supported on a plurality of supports, such as support 20, the mass is sufficient to effect inward bending of the support members 28, 30, 32 and 34 at the junctions 50 between the lower sections 35 and the upper sections 37 as exaggeratedly shown in FIG. 7. Though such bending is slight, the shaft is nevertheless grasped by the support members at the aforementioned junctions.

In this manner, a stable relationship is established between the shaft 40 and the support members 28, 30, 32 and 34. This stable relationship is highly desirable since it prevents annoying shifting of the load, for example, such as a stationary house trailer which is supported by a plurality of supports 20, when it is subjected to air currents.

Although the shaft 40 is grasped by the support members at the junctions 50, by applying turning pressure with a wrench to the nut, the shaft can be moved vertically to the desired height. The support members are formed of resilient steel; therefore, when the load pressure is removed from the shaft, the support members return sufficiently to positions in which they no longer grasp the shaft.

Having described my invention, I claim:

1. A vertically adjustable support comprising in combination:

A. a plurality of vertically extending and resilient legs, said legs angling upwardly toward one another to an area below the upper ends thereof, a plurality of said legs angling upwardly and outwardly from said area;

B. means vertically spaced from and below the said area for fastening the legs to one another;

C. means joining the upper ends of the legs;

D. a shaft extending vertically through said area, said shaft having a threaded section above the area, said shaft being engageable by said plurality of legs at said area;

E. an article support fixed to the upper end of the shaft;

F. a nut resting on the said second mentioned means and threaded onto the shaft.

2. A vertically adjustable support as defined in claim 1, characterized in that another of the legs angles upwardly and outwardly from said area.

3. A vertically adjustable support as defined in claim 1, characterized in that said plate is provided with:

1. a projection extending upwardly and laterally from the axis of the shaft.

4. A vertically adjustable support as defined in claim 1, characterized in that another of the legs angles upwardly and outwardly from said area; and further characterized in that said plate is provided with:

1. a projection extending upwardly and laterally from the axis of the shaft.

* * * * *